March 1, 1955  J. W. GRAY ET AL  2,703,400
COMPENSATED PLAN POSITION INDICATOR
Filed June 7, 1945  2 Sheets-Sheet 1

*INVENTORS.*
JOHN W. GRAY
GEORGE WAYNE RODEBACK
*BY*
William D. Hall
ATTORNEY

March 1, 1955  J. W. GRAY ET AL  2,703,400
COMPENSATED PLAN POSITION INDICATOR
Filed June 7, 1945
2 Sheets-Sheet 2
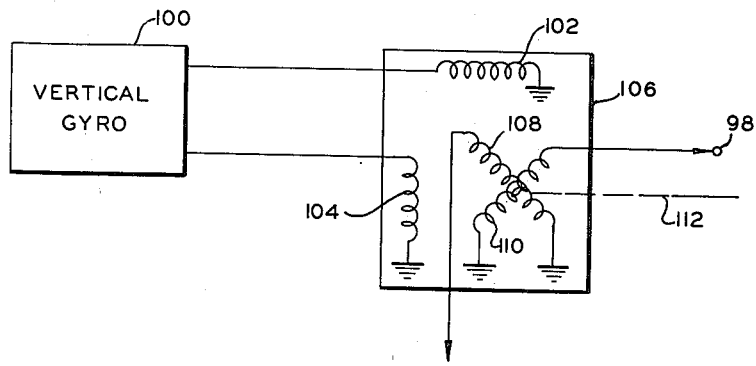
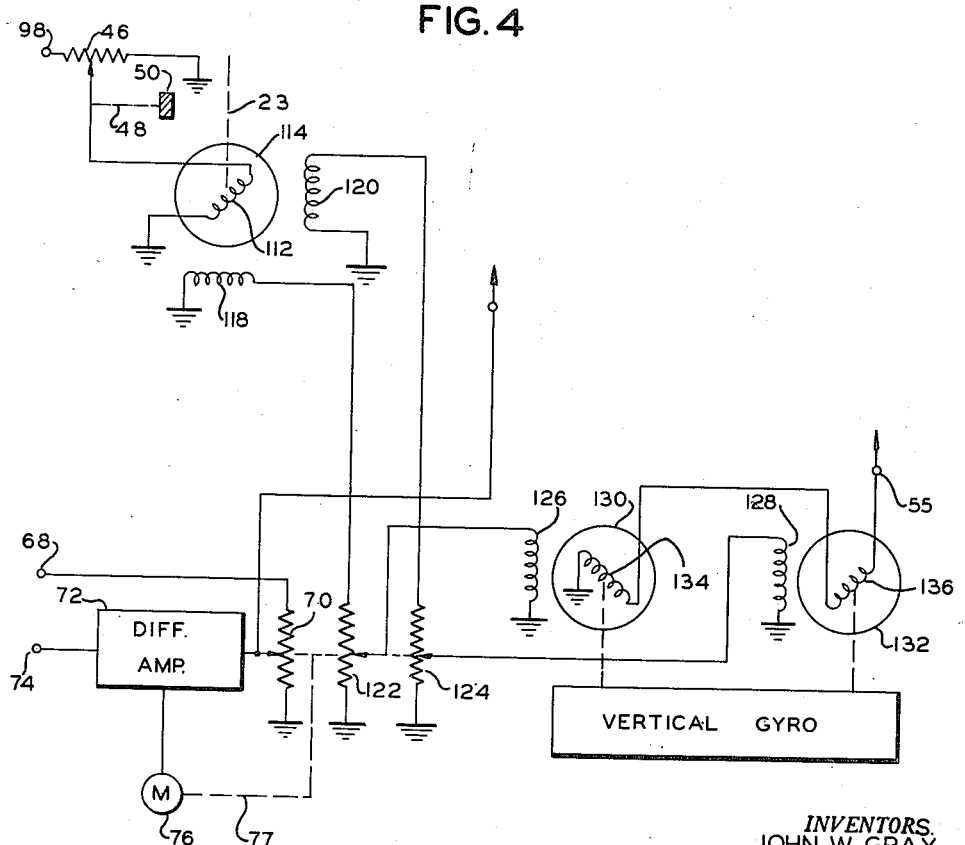
INVENTORS.
JOHN W. GRAY
GEORGE WAYNE RODEBACK
BY
William D. Hall,
ATTORNEY

United States Patent Office 2,703,400
Patented Mar. 1, 1955

2,703,400

COMPENSATED PLAN POSITION INDICATOR

John W. Gray and George Wayne Rodeback, Cambridge, Mass., assignors, by mesne assignments, to the United States of America as represented by the Secretary of War Application June 7, 1945, Serial No. 598,163

11 Claims. (Cl. 343—11)

The present invention relates in general to electrical circuits and more particularly to indicator control circuits for use with a radio object locating system.

In one type of radio object locating system and more specifically in such a system as adapted for use in aircraft, a directional antenna is used to project a beam of electromagnetic energy having a shape similar to a fan in character, the beam being wide in a plane perpendicular to the surface of the earth and narrow in a plane parallel to the surface of the earth. This beam is caused to rotate in azimuth in such a manner that the entire ground area surrounding the aircraft is periodically covered up to some predetermined range.

A common indicating device in such a system is a plan position indicator, or as it is commonly abbreviated for convenience PPI. In this indicator a cathode ray tube is used in which the electron beam is swept across the face of the tube radially from the center to the periphery. The sweep is rotated about its point of origin in such a way that its orientation with respect to some fixed direction corresponds to the azimuth of the radiated electromagnetic beam. Echoes returned from objects in the vicinity are utilized to intensify the sweep at a position corresponding to the position of the object returning the echo. In this way a pattern is formed which has an appearance roughly resembling the ground surface in the vicinity of the aircraft.

A modification of this method of presentation is known as sector scanning. In this modification, the sweep is rotated over only a limited angle and thus forms a pattern resembling a sector rather than an entire circle. In sector scanning the origin of the sweep need not be in the center of the face of the cathode ray tube.

It is advantageous in many systems of this type to generate markers corresponding to the computed azimuth and range of some selected object. By means of these markers, the computed position of the object may be compared with the actual position of the object as it is indicated on the cathode ray tube screen.

It may easily be seen that certain motions of the aircraft will affect the orientation of the beam from the antenna, and hence unless compensations are made, object echoes will be displaced from their normal positions on the indicator screen. These motions include change in course of the aircraft, roll, and pitch. Roll may be defined as rotation about an axis parallel to the direction of flight of the aircraft. Pitch may be defined as rotation about a horizontal axis perpendicular to the direction of flight of the aircraft.

In the abandoned application of Britton Chance et al., Serial No. 586,420, entitled "Communication Method," filed April 4, 1945, there is described the desirability of using a sector scan in conjunction with a sweep generator whose sweep speed may be adjusted to be inversely proportional to the range of a selected target. This effectively causes the target indication to remain stationary in range on the screen.

Eventually a certain limit is reached beyond which the sweep speed can no longer be conveniently increased. In this case, it is advantageous to move the origin of the sweep in a direction opposite to the motion of the target so that again the target will remain stationary in range on the face of the indicator.

Accordingly, it is one object of this invention to provide a means of controlling the sweep rotation of a PPI indicator of an airborne radio object locating system to compensate for the effect of roll and pitch of the aircraft. A second object is to provide means of adjusting the position of an azimuth marker in such a system to compensate for roll and pitch of the aircraft. Another object is to provide a means for generating a voltage which may be utilized to cause the sweep speed of an indicator system to be inversely proportional to the range of a selected target. A further object is to provide a means of producing a voltage which may be utilized to displace the origin of a sector scan system in a direction opposite to the displacement of the target.

Other objects, features, and advantages of this invention will suggest themselves to those skilled in the art and will become apparent from the following description of the invention taken in connection with the accompanying drawing in which:

Fig. 3 is a schematic diagram of an alternative device which may be substituted for one portion of the apparatus of Fig. 2; and Fig. 4 is a schematic diagram showing a further alternative form of one portion of the invention.

Figure 1:
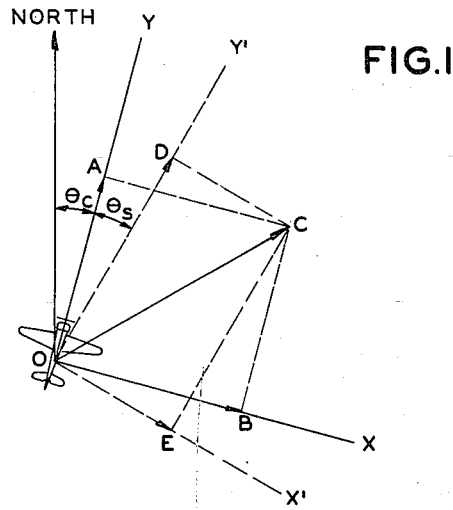
Fig. 1 is a diagram showing the relations between the various vectors and angles involved in the operation of the invention.

Referring now more particularly to Fig. 1, there are shown two sets of perpendicular axes having a common point of origin O. An aircraft is located at point O, and its heading is used to determine the direction of the Y axis of the set of axes XY. The aircraft carries a radio object locating system including a rotatable directional antenna. The direction of this rotatable antenna or spinner in a horizontal plane determines the direction of the Y' axis of the second set of axes X'Y'. The angle between the heading of the aircraft and north is $\theta_c$, while the angle between the heading of the aircraft and the direction of the spinner is $\theta_s$.

It is useful to use the convention of representing an angular displacement by a vector along the axis of rotation, the magnitude of the vector being proportional to the magnitude of the angular displacement. Thus in Fig. 1 the amount of roll at a given instant is shown by the vector OA, while the amount of pitch at the same instant is shown by vector OB. For small angles of roll and pitch, the net rotation of the plane can be represented by OC, the vector sum of the roll and pitch component vectors as shown. The axis along which this resultant vector lies may be called the "axis of resultant rotation."

The vector OC may be resolved into components along axes X' and Y'. Vector OD is the component along the Y' axis and is known as "cross level angle," denoted by the letter B. Vector OE is the component along the X' axis and is known as "tilt angle."

As an aid in visualizing cross level angle, it may be stated that if when the aircraft is horizontal, the antenna delivers a fan beam, the plane of whose widest beam angle is vertical, then when the aircraft is not horizontal, this plane is displaced from the vertical by the cross level angle.

Figure 2:
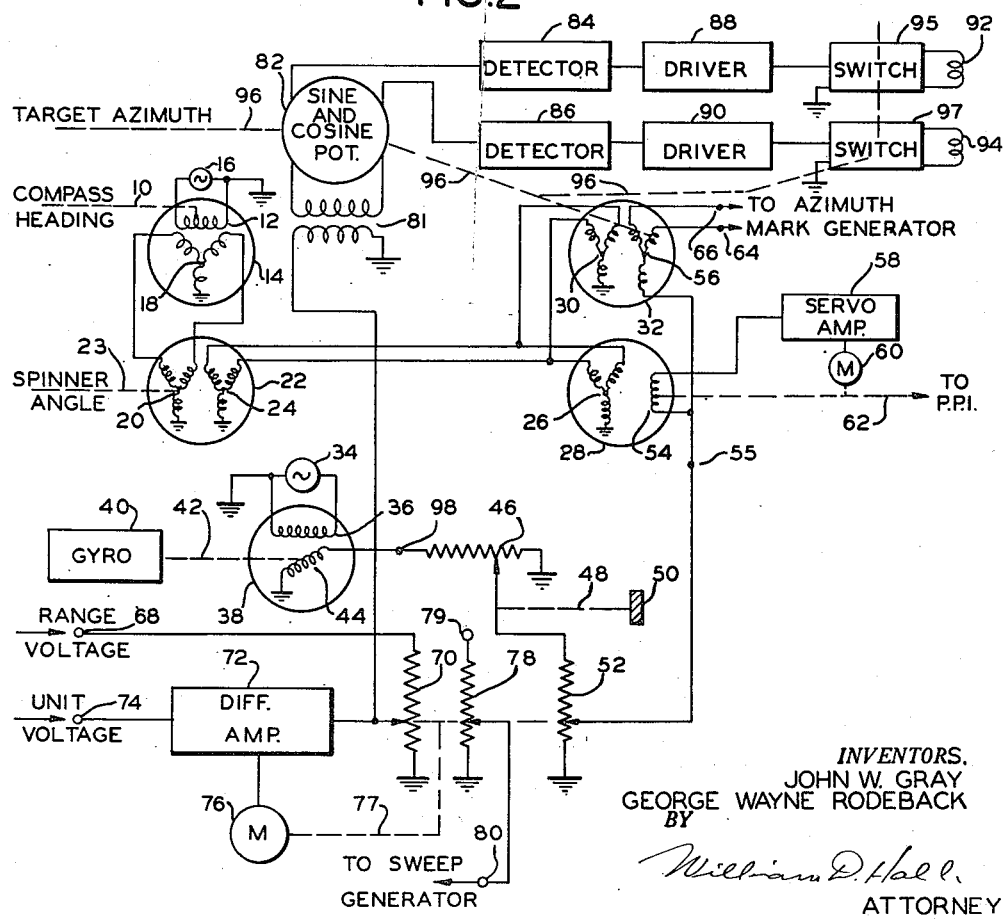
Fig. 2 is a functional diagram of one embodiment of the invention.

Referring now to Fig. 2, a shaft 10, turned by a compass or other direction-indicating device is used to rotate the rotor 12 of "Selsyn" 14, which is excited by a source of A.-C. voltage 16. The three windings of the stator 18 are respectively connected to the three windings of the rotor 20 of "Selsyn" 22, which is positioned by shaft 23. Rotor 20 consists of three coils symmetrically spaced about the axis of rotation. The three windings of the stator 24 of "Selsyn" 22 are respectively connected to the three windings of the stator 26 of "Selsyn" 28, as well as to the three windings of the stator 30 of "Selsyn" 32, which may be of the same type as "Selsyn" 22.

A source of A.-C. voltage 34, which may be either the same as A.-C. voltage source 16 or in phase with it, is used to excite the primary 36 of rotary transformer 38. A vertically mounted gyro 40 is connected by a shaft 42 to the rotor 44 of rotary transformer 38. Both gyro 40 and rotary transformer 38 are mounted so that their entire mountings rotate with the spinner. The output of rotor 44 is connected to potentiometer 46, the variable tap of which is adjusted by means of shaft 48, which is connected to altitude-set knob 50. The voltage at the variable tap of potentiometer 46 is applied to potentiometer 52, the variable tap of which is connected to rotors 54 and 56 of "Selsyns" 28 and 32 respectively. The output of rotor 54 is applied to a servo amplifier 58, which may be of a type well known in the art and supplies voltage to motor 60. Motor 60 may be of the two-phase type having one constant field and producing a rotation, the speed and direction of which are determined by the magnitude and direction of the second field supplied by amplifier 58. Motor 60 drives shaft 62 which in turn positions rotor 54. The output voltages from rotor 56 appear at terminals 64 and 66.

An A.-C. voltage proportional to the computed ground range of a selected target is applied through terminal 68 to potentiometer 70, the variable tap of which is connected to the input of differential amplifier 72, which may be of any type common in the art. For example this amplifier may be one having two input voltages of opposite phase connected in such a manner that an output is produced only when the two input voltages are unequal in magnitude. The input circuit may, for example, consist of two transformers the secondaries of which are connected in series, by means of which the two voltages of opposite phase are introduced. An apparatus for producing an A.-C. voltage proportional to the computed ground range of a selected target, for example, is described in the copending application of John W. Gray and Duncan MacRae, Jr., Serial No. 598,162, filed June 7, 1945, entitled "Electrical Apparatus."

A unit, or constant magnitude, input voltage is applied through terminal 74 to the second input of differential amplifier 72. The output of amplifier 72 operates motor 76, which in turn is connected by a shaft 77 to the variable contact of potentiometer 70. Motor 76 may be of the same type as motor 60. The variable tap of potentiometer 70 is mechanically connected to the variable taps of potentiometers 52 and 78, the latter of which has a D.-C. voltage applied to it through terminal 79, and supplies an output voltage from its variable tap to terminal 80.

The voltage at the variable tap of potentiometer 70 is also applied through transformer 81 to sine-cosine potentiometer 82, which may be of the type described in the copending application of Edward F. MacNichol, Jr., Serial No. 598,158, entitled "Electrical Circuit," filed June 7, 1945, now abandoned. The two output voltages of potentiometer 82 are applied to detectors 84 and 86 respectively and the output voltages from these detectors are in turn applied to driver circuits 88 and 90 respectively. Driver circuits 88 and 90 are used to supply deflecting currents to coils 92 and 94 located in the PPI indicator. Sine-cosine potentiometer 82 is positioned by means of shaft 96, which serves also to position rotor 56 of "Selsyn" 32. Shaft 96 may also be used to operate reversing switches 95 and 97 through which coils 92 and 94 are connected between the drivers and ground.

The portions of the circuit of Fig. 2 including shafts 10 and 23, "Selsyns" 14, 22, 28 and 32, A.-C. source 16, and the servo loop consisting of amplifier 58, motor 60 and shaft 62 may be components of a system of the type described in the copending application of John W. Gray and Ivan A. Greenwood, Serial No. 598,161, filed June 7, 1945, entitled "Electrical Apparatus."

It is apparent when the aircraft is horizontal that in order to obtain a PPI indicator pattern which is stationary with respect to geographical direction, the sweep should be rotated about its origin in such a manner that $$\theta_p = \theta_c + \theta_s$$

where $\theta_p$ is the angle of the sweep with respect to the north reference on the indicator screen, and $\theta_c$ and $\theta_s$ are as shown in Fig. 1.

It can be seen further that if the aircraft is displaced from the horizontal so that the cross level angle is B, then the lateral displacement of the fan beam on the surface of the earth is Bh, if B is in radians and of a small value and h is the altitude. If an object at a horizontal range r is being observed on the indicator, then the azimuth displacement in radians of the fan beam at this range is $$\frac{Bh}{r}$$

Since a clockwise rotation through a cross level angle B is taken as positive, and this would cause a counter-clockwise displacement in azimuth, then in order for objects at a horizontal range r to be indicated at the correct azimuth, the sweep should rotate according to the equation $$\theta_p = \theta_c + \theta_s - \frac{hB}{r} \qquad (1)$$

It has been found convenient to utilize a null in the output voltage from a "Selsyn" to produce an azimuth for comparison with actual azimuth of some selected target as mentioned above. The voltage null should occur when the sweep trace on the PPI indicator coincides in azimuth with the computed direction of the selected target. In other words, if $\theta_t$ is the computed azimuth of the target with respect to north, the null should occur when $$\theta_t = \theta_p$$

or $$\theta_t = \theta_c + \theta_s - \frac{hB}{r} \qquad (2)$$

It may be seen that the tilt angle, if small, will not cause a displacement in range or azimuth of a target indication, but may cause a variation in intensity due to a variation of strength of the radiated beam in a vertical plane. Some method may be used if desired to counteract tilt by nodding the antenna in elevation.

When the apparatus of Fig. 2 is in operation, primary 36 of rotary transformer 38 is excited by a source of A.-C. voltage 34, while gyro 40 mounted on the spinner produces a shaft displacement equal to cross level angle which is applied to the rotor 44. Hence the voltage appearing at terminal 98 is proportional to the sine of cross level angle, or for small angles such as are assumed to be involved, proportional to cross level angle B. Calibrated altitude-set knob 50 and shaft 48 attached thereto are used to move the slider of potentiometer 46 from the grounded end by an amount proportional to altitude h. The output voltage from potentiometer 46 is then proportional to hB.

An A.-C. voltage proportional to the computed ground range of the selected target is applied to terminal 68 while a unit A.-C. voltage which may be of opposite phase is applied to terminal 74. The output from the variable tap of potentiometer 70 is applied to one input of differential amplifier 72, while the unit voltage from terminal 74 is applied to the other input. Differential amplifier 72 operates as described above and produces an output voltage only when the two input voltages to it are unequal in magnitude. This output voltage is used to excite one field of motor 76. This causes motor 76 to rotate in such a manner that the variable tap of potentiometer 70 is placed at a point where the voltage is equal to the unit voltage applied through terminal 74. It can thus be seen that the variable tap of potentiometer 70 is displaced from the grounded end by a distance which is inversely proportional to the ground range voltage applied to terminal 68.

Since the variable tap of potentiometer 52 is mechanically connected to that of potentiometer 70, the former will likewise be displaced from the grounded end by an amount inversely proportional to the computed ground range of a selected target. Since the voltage applied to potentiometer 52 is proportional to hB, then it can be seen that the voltage produced at the variable tap will be proportional to $$\frac{hB}{r}$$

and this voltage is applied to terminal 55.

Shaft 10, as described above, is positioned so that it turns rotor 12 of "Selsyn" 14 to an angle $\theta_c$ defined above. Since rotor 12 is excited by A.-C. source 16, it sets up a field in "Selsyn" 14, the orientation of which is determined by the position of the rotor. Hence, voltages are induced in the coils of stator 18 which in turn set up corresponding currents in rotor 20 of "Selsyn" 22. These currents are such that they set up a resultant field in "Selsyn" 22 at an angle $\theta_c$ with the position of rotor 20. Rotor 20 itself is turned to an angle $\theta_s$, defined above, and hence the resultant field in "Selsyn" 22 is at an angle $\theta_c + \theta_s$. Rotor 20 may be mechanically coupled through shaft 23 to the spinner. The field set up in "Selsyn" 22 is transmitted through the stator 24 to the stators 26 and 30 of "Selsyns" 28 and 32 respectively in the same manner as described above.

A voltage is induced in rotor 54 of "Selsyn" 28, the magnitude of which depends on the relative positions of the rotor and the field. If any voltage is induced in rotor 54, it is amplified by servo amplifier 58, and used to operate motor 60. This servo system operates in the conventional manner well known in the art, and hence rotor 54 is continually turned to a position in which no voltage is induced in it.

The correction voltage applied to terminal 55 is proportional to $$\frac{hB}{r}$$

and if this is made of the proper polarity by proper orientation of rotary transformer 38, the voltage output E of rotor 54 will be $$E = E_1 \sin(\theta_s + \theta_c - \theta_r) - k\frac{hB}{r} \quad (3)$$

where $E_1$ is the maximum voltage capable of being induced in rotor 54 by the field, $\theta_r$ is the angle of the rotor, $k$ is the constant of proportionality between the correction voltage and the azimuth correction, and the other symbols are as previously defined in Equation 1. Since the angle $(\theta_s + \theta_c - \theta_r)$ will be small, Equation 3 may be written $$E \doteq E_1(\theta_s + \theta_c - \theta_r) - \frac{khB}{r}$$

If by a proper choice of values $k$ is made numerically equal to $E_1$, then $$E \doteq k\left(\theta_s + \theta_c - \theta_r - \frac{hB}{r}\right)$$

and this will equal zero when $$\theta_s + \theta_c - \theta_r - \frac{hB}{r} = 0$$

or $$\theta_r = \theta_s + \theta_c - \frac{hB}{r} \quad (4)$$

Thus, it is seen that rotor 54 will be positioned so that Equation 4 is true, and this position may be transmitted by means of shaft 62 to the deflecting means, which may be magnetic deflection coils of a conventional rotating type, in the indicator of the radio object locating system.

The field set up by stator 30 in "Selsyn" 32 is similarly at an angle $\theta_c + \theta_s$. Rotor 56 is turned by shaft 96 to an angle corresponding to the computed azimuth of some selected target. By an analysis similar to that just given for "Selsyn" 28, it can be shown that if rotor 56 is properly positioned on its shaft, a null of output voltage will occur at terminal 64 when Equation 2 is true. At this time the voltage at terminal 66 will not be zero, and this voltage may be used to prevent an azimuth mark from being produced in a position 180° from the desired position.

A D.-C. voltage is applied through terminal 79 to potentiometer 78, the variable tap of which is also displaced from the grounded end by an amount inversely proportional to $r$. Thus, the D.-C. voltage appearing at the variable tap of potentiometer 78 is inversely proportional to $r$, and this voltage is obtained as an output at terminal 80. This voltage may be used as a charging voltage in a ground range or hyperbolic sweep generator and it can be seen that the average rate of charge of the capacitor in the sweep generator will be proportional to the magnitude of the charging voltage. The average rate of charge of this capacitor determines the average speed of the sweep. Then the average sweep speed will likewise be inversely proportional to the ground range of a selected target.

A sweep generator producing a ground range or hyperbolic sweep is described in the copending application by Jack H. Irving, Serial No. 570,412, entitled "Electrical Apparatus and Method," filed December 29, 1944, now U. S. Patent 2,611,126, issued September 16, 1952.

Due to the action of differential amplifier 72, the voltage appearing at the variable tap of potentiometer 70 will be constant in magnitude as long as the voltage entering through terminal 68 is equal to or greater than that entering at terminal 74. The voltage output from potentiometer 70 is also applied through transformer 81 to sine-cosine potentiometer 82. This potentiometer is rotated by shaft 96 by an amount equal to $\theta_t$, and therefore the two output voltages are in the same ratio as are the east-west and north-south components of the target displacement. These output voltages are rectified by detectors 84 and 86 and applied to driver circuits 88 and 90, which in turn produce deflecting currents in coils 92 and 94 such that the displacement of sweep origin is opposite to the direction of the target. From the foregoing description, it will be noted that as long as the variable tap of potentiometer 70 has not reached the limit of its displacement, the voltage applied to sine-cosine potentiometer 82 is constant. For this reason the resultant field produced by the deflecting currents in coils 92 and 94 is constant in magnitude under these conditions.

Eventually a point is reached when the average sweep speed is no longer proportional to the voltage applied to the sweep generator. By proper choice of circuit constants, this point may be reached at approximately the time when the variable taps of potentiometer 52, 70, and 78 have reached the limits of their displacements. As the computed range of the target decreases further, the output voltage from terminal 80 remains contant, whereas the voltage applied to transformer 81 decreases proportionally with range. Therefore the average sweep speed will remain constant; while the deflecting currents in coils 92 and 94 will decrease proportionally with range. In this manner, the origin of the sector sweep will move toward the center of the indicator screen by an amount equal to the change in range of the target. The target will therefore as before remain at a constant distance from the center of the indicator screen.

It may be observed that when the variable tap of potentiometer 52 has reached its limit of upward displacement, the azimuth correction voltage will no longer change so as to remain inversely proportional to range. The resulting error in the position of the PPI sweep and azimuth marker at the small ranges where this occurs is negligible as compared with other errors appearing under these conditions.

Since detectors 84 and 86 are not responsive to the phase of the input to them, reversing switches 95 and 97 must be provided so that the deflecting currents in coils 92 and 94 are of the proper polarity to cause the deflection of the origin of the sector sweep to be in a direction opposite to the displacement of the target. These switches may be operated by a cam on shaft 96.

In Fig. 3, there is shown an alternative arrangement which may be used in case it is not feasible to mount gyro 40 and rotary transformer 38 so that their entire mountings rotate with the spinner. Vertical gyro 100 may be mounted in the aircraft so that it produces two A.-C. output voltages proportional respectively to roll and pitch. These voltages are applied to field coils 102 and 104 respectively of resolver 106, which are arranged perpendicular to each other. A rotor including coils 108 and 110, also perpendicular to each other, is positioned by shaft 112. The output voltage from coil 110 may be applied to terminal 98 shown in Fig. 2 and Fig. 3, and gyro 40 and transformer 38 may be omitted, while the remainder of the circuit is the same as Fig. 2.

Since coils 102 and 104 of resolver 106 are at right angles to each other, the resultant field in the resolver is the vector sum of the roll and pitch vectors, shown as OC in Fig. 1. Shaft 112 is mechanically or electrically connected to the spinner so that it turns with it, and therefore, if rotor coils 108 and 110 are positioned properly on the shaft, there are induced in them voltages proportional respectively to tilt angle and cross level angle. The voltage from coil 110, being proportional to B, may be applied directly to terminal 98, while the remainder of the circuit operates as previously described. The voltage from coil 108 may be used as a tilt correction voltage if desired.

Reference is now made to Fig. 4, in which a further modification of the invention is shown. This form may be utilized in case a vertical gyro is available which produces shaft rotations equal to roll and pitch rather than electrical output. Certain parts are shown which are identical with parts of Fig. 2, and hence have the same reference numbers. In this circuit potentiometer 46, shown also in Fig. 2, is supplied with an A.-C. voltage of constant magnitude through terminal 98. The variable tap of potentiometer 46 is positioned by shaft 48 turned by altitude-set knob 50 substantially as described in connection with Fig. 2 above. The variable tap of potentiometer 46 is connected to the rotor 112 of converter 114, which is positioned by shaft 23.

Converter 114 contains further two stator coils 118 and 120, arranged to be mutually perpendicular and connected respectively to potentiometers 122 and 124. The variable taps of these potentiometers are ganged to that of potentiometer 70 and that of potentiometer 78 (omitted for simplicity of circuit) and the assembly positioned by shaft 77, which is turned by a system substantially as previously described in connection with Fig. 2. The variable taps of potentiometers 122 and 124 are respectively connected to the stators 126 and 128 of rotary transformers 130 and 132, the rotors 134 and 136 of which are connected in series and the combined output of which is available at terminal 55. Rotors 54 and 56 are connected to terminal 55 as shown in Fig. 2. The remainder of the circuit is as shown in Fig. 2 with the omission of gyro 40, rotary transformer 38, and potentiometer 52.

The slider of potentiometer 46 is manipulated by knob 50 through shaft 48 so that the output is proportional to $h$. Rotor 112 of converter 114 is turned by shaft 23 to an angle $\theta_s$. Stator coils 118 and 120 are so positioned that the voltages induced in them are proportional to $h \sin \theta_s$ and $h \cos \theta_s$ respectively. The sliders of potentiometers 122 and 124 are moved from the grounded ends by an amount inversely proportional to computed ground range $r$, since they are attached to the slider of potentiometer 70, which moves as previously described. The two output voltages of these potentiometers are hence proportional to $$\frac{h \sin \theta_s}{r} \quad \text{and} \quad \frac{h \cos \theta_s}{r}$$

respectively.

The rotor 134 of transformer 130 is rotated through an angle equal to the pitch, while rotor 136 of transformer 132 is rotated through an angle equal to the roll. This motion causes the output voltages to be equal to the input voltages times the sines of the angles of rotation, but since small angles of roll and pitch are assumed, the outputs are approximately $$\frac{h}{r} \sin \theta_s \times \text{pitch} \quad \text{and} \quad \frac{h}{r} \cos \theta_s \times \text{roll}$$

It may be shown trigonometrically that the sum of these two quantities is $$\frac{hB}{r}$$

and for this reason the two are added by connecting rotors 134 and 136 in series. The total correction voltage may then be applied to terminal 55 and utilized exactly as described for the circuit of Fig. 2.

It will be obvious that a gyro such as is shown in Fig. 4 may be utilized in conjunction with two independent rotary transformers to produce voltages equivalent to those applied to coils 102 and 104 of resolver 106 shown in Fig. 3. If used with such a resolver the arrangement would be equivalent in output to that of Fig. 3 and could be used in place of it.

While there have been described what are at present considered preferred embodiments of this invention, it will be obvious to those skilled in the art that various changes and modifications may be made therein without departing from the scope of the invention as set forth in the appended claims.

The invention claimed is:

1. A system on a moving craft for compensating changes due to roll, pitch and range in the indications incidental to the operation of a radio object locating system of the plan position type having a sector scanning antenna and an indicator, said indicator giving indications of the azimuth and plan position of given targets and having an indicator sweep speed and a scanning sector origin; comprising first means for controlling the plan position indication of the system; second means for controlling the generation of an azimuth marker; third means for controlling the location of the origin of the scanning sector; fourth means for controlling the speed of sweep of the indicator; means on said craft having portions respectively disposed to be responsive to the azimuth of the target, the compass heading of the craft, of the angle assumed by the sector scanning antenna relative to the heading of the craft, of the altitude of the craft, and to the range, for providing corresponding proportional electrical and mechanical quantities; means in operative connection with the craft to be controlled by the movements thereof responsive to the roll and pitch of the craft and responsive to said quantities proportional to relative altitude and target range, for providing a correcting voltage; and means for applying said quantities and said correcting voltage to said respective first, second, third and fourth controlling means for modifications of the indicator functions controlled thereby, said first controlling means receiving said control voltage, and said quantities proportional to the compass heading, and to the angle of the sector scanning antenna; said second controlling means receiving said control voltage and quantities proportional to the target azimuth, and to the angle of the sector scanning antenna; said third controlling means receiving said quantity proportional to the target azimuth and to that of the range; said fourth controlling means receiving said quantity proportional to the target range.

2. A system on a moving craft for compensating changes due to roll, pitch and range in the indications incidental to the operation of a radio object locating system of the plan position type having a sector scanning antenna and an indicator, said indicator giving indications of the azimuth and plan position of given targets and having an indicator sweep speed and a scanning sector origin; comprising means disposed in the craft to be responsive to changes in the cross level angle assumed by the craft, for producing a first alternating voltage having a value corresponding to said assumed angle; means having portions respectively disposed to be responsive to the target altitude and range of the craft operatively coupled to said voltage producing means, for modulating said first voltage in proportion to the altitude and inversely proportional to the range, a resultant correcting voltage being provided thereby; first means for controlling the plan position indication of the system; second means for controlling the generation of an azimuth marker; third means for controlling the location of the origin of the scanning sector; fourth means for controlling the speed of sweep of the indicator; means on said craft having portions respectively disposed to be responsive to the azimuth of the target, the compass heading of the craft, and of the angle assumed by the sector scanning antenna relative to the heading of the craft for providing corresponding proportional electrical and mechanical quantities; and means for applying said quantities and said correcting voltage to said respective first, second, third and fourth controlling means for modifications of the indicator functions controlled thereby, said first controlling means receiving said control voltage, and said quantities proportional to the compass heading, and to the angle of the sector scanning antenna; said second controlling means receiving said control voltage and quantities proportional to the target azimuth, and to the angle of the sector scanning antenna; said third controlling means receiving the said quantity proportional to the target azimuth and to that of the range; said fourth controlling means receiving said quantity proportional to the target range.

3. A system on a moving craft for compensating changes due to roll, pitch and range in the indications incidental to the operation of a radio object locating system of the plan position type having a sector scanning antenna and an indicator, said indicator giving indications of the azimuth and plan position of given targets and having an indicator sweep speed and a scanning sector origin; comprising means for transmitting angular information, including a plurality of devices respectively operatively connected to said craft to be responsive to the azimuth of the target, the compass heading of the craft and of the angle assumed by the sector scanning antenna relative to the heading of the craft, and means to provide a signal inversely proportional to the range; first means for controlling the plan position indication of the system; second means for controlling the generation of an azimuth marker; third means for controlling the location of the origin of the scanning sector; fourth means for controlling the sweep speed of the indicator; and means interconnecting certain ones of said devices and said range signal providing means with said respective controlling means for effecting modifications of the respective indicator functions controlled thereby, said first controlling means having connections to said compass heading and to said scanning antenna angle responsive devices; said second controlling means having connections to said target azimuth and to said scanning antenna angle responsive devices; said third controlling means having connections to said target azimuth responsive device and to said range signal providing means; said fourth controlling means having connections to said range signal providing means.

4. In a system on a moving craft for compensating changes due to roll, pitch and range in the indications incidental to the operation of a radio object locating system of the plan position type having a sector scanning antenna and an indicator, said indications including with respect to a given target a control for the origin for the scanning sector as it appears on the indicator, the combination comprising means for controlling the relative location of the origin of the scanning sector as appearing on the indicator; a voltage transducer; first means for supplying said transducer angular information in accordance with the azimuth of the target, second means for controlling said transducer in inverse proportion to the range, the output of the transducer being controlled by said angular information and the inverse of the range; and means, forming a connection and disposed intermediate said transducer and said origin controlling means for effecting the application of an output signal to the latter derived from the former.

5. A system according to claim 4, wherein said transducer comprises a potentiometer having two outputs, respectively having a sine and a cosine characteristic, and said applying means includes a detector for each output.

6. In a system on a moving craft for compensating changes due to roll, pitch and range in the indications incidental to the operation of a radio object locating system of the plan position type having a sector scanning antenna and an indicator; the combination comprising first means for controlling the generation of an azimuth marker; second means for controlling said first means in accordance with the azimuth of the target; third means comprising an angular information transmitter, in operative connection with the craft and the antenna, for controlling said first means in accordance with the angle comprised of the compass heading of the craft and the angle assumed by the sector scanning antenna; fourth means, disposed for control by the craft, for controlling said first means for providing a correcting voltage therefor, and including means responsive to changes in the cross level angle assumed by the craft, for producing a first alternating voltage having a value corresponding to said assumed angle, and means, having portions respectively responsive to the altitude and range of the craft, for modulating said first voltage in proportion to the altitude and inversely proportional to the range; and means forming a connection from said fourth to said first means.

7. In a system on a moving craft for compensating changes due to roll, pitch and range in the indications incidental to the operation of a radio object locating system of the plan position type having a sector scanning antenna and an indicator; the combination comprising first means for controlling the plan position indication of the system; second means, in operative connection with the craft and the antenna, comprising an angular information transmitter for controlling said first means in accordance with the angle comprised of the compass heading of the craft and the angle assumed by the sector scanning antenna; third means for controlling said first means for providing a correcting voltage therefor and including means disposed to be responsive to changes in the cross level angle assumed by the craft, for producing a first alternating voltage having a value corresponding to said assumed angle, and means, having portions respectively arranged to be responsive to the altitude and range of the craft, for modulating said first voltage in proportion to the altitude and inversely proportional to the range; and means forming a connection from said third to said first means.

8. A combination according to claim 7 wherein said first means includes an angular information transmitter and an angular positioning motor controlled thereby.

9. A system according to claim 1, wherein said first alternating voltage producing means comprises a vertically mounted gyroscope having a shaft arranged to be rotatable in response to the cross level angle assumed by the craft, and a rotary transformer having a rotor connected to be rotated by said shaft.

10. A system according to claim 1, wherein said first alternating voltage producing means comprises a vertically mounted gyroscope in the craft having an electrical output proportional to the pitch and roll of the craft and a resolver of the rotary inductor type having an output proportional to the cross level angle of the craft.

11. A system according to claim 1, wherein said correcting voltage providing means comprises an angular information resolver having a rotor connected to be positioned in accordance with the angle assumed by the sector scanning antenna relative to the heading of the craft, a source of potential for said resolver having a control connected to be responsive to changes in altitude of the craft, means responsive to the range of the craft, for modulating the output of said resolver connected thereto, a pair of rotary transformers, each having a rotor, one electrically in series with the other, and a stator mounted to be energized by the output of said resolver and said modulating means, and a vertically mounted gyroscope in the craft having two output shafts controlled by movements of the craft to be respectively rotatable in proportion to the pitch and roll of the craft.

References Cited in the file of this patent

UNITED STATES PATENTS

| | | |
|---|---|---|
| 1,840,104 | Anschntz-Kaempfe | Jan. 5, 1932 |
| 2,426,658 | Wooldridge | Sept. 2, 1947 |
| 2,426,979 | Ayres | Sept. 9, 1947 |
| 2,480,208 | Alvarez | Aug. 30, 1949 |
| 2,492,355 | Campbell et al. | Dec. 27, 1949 |